UNITED STATES PATENT OFFICE.

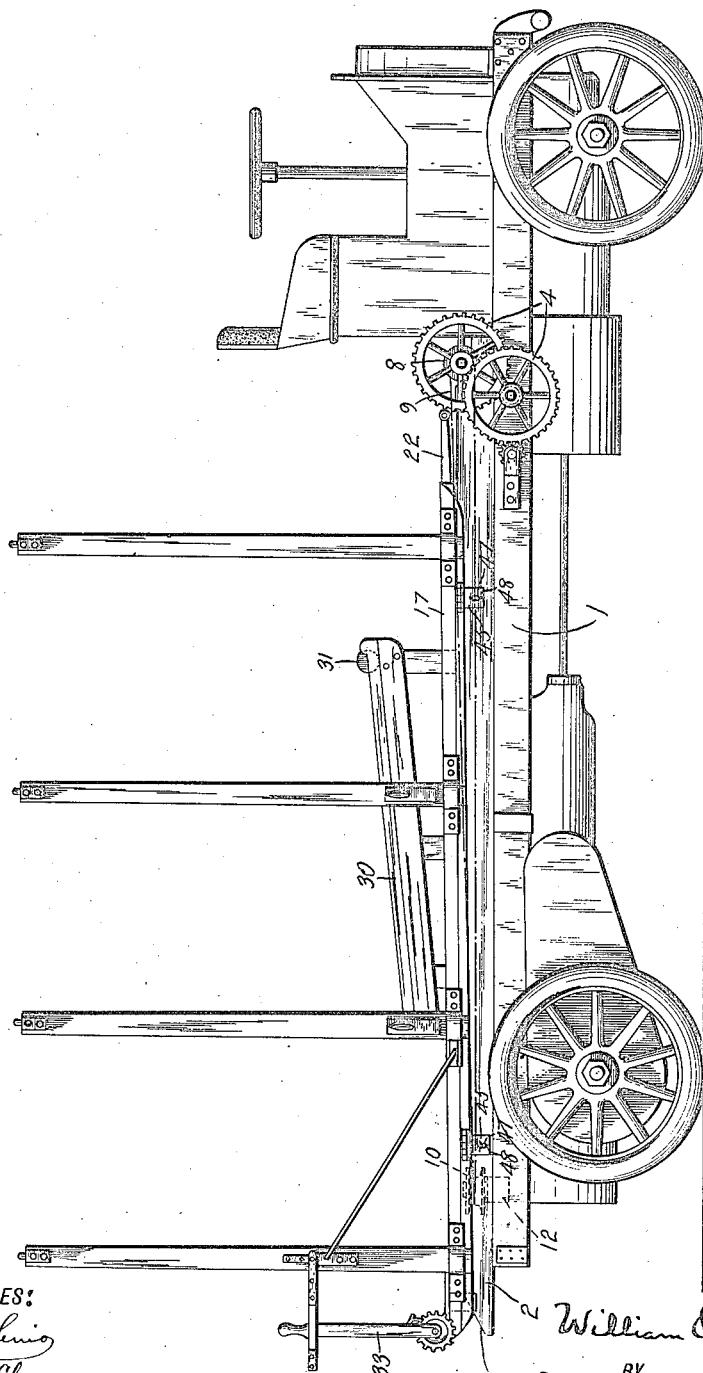

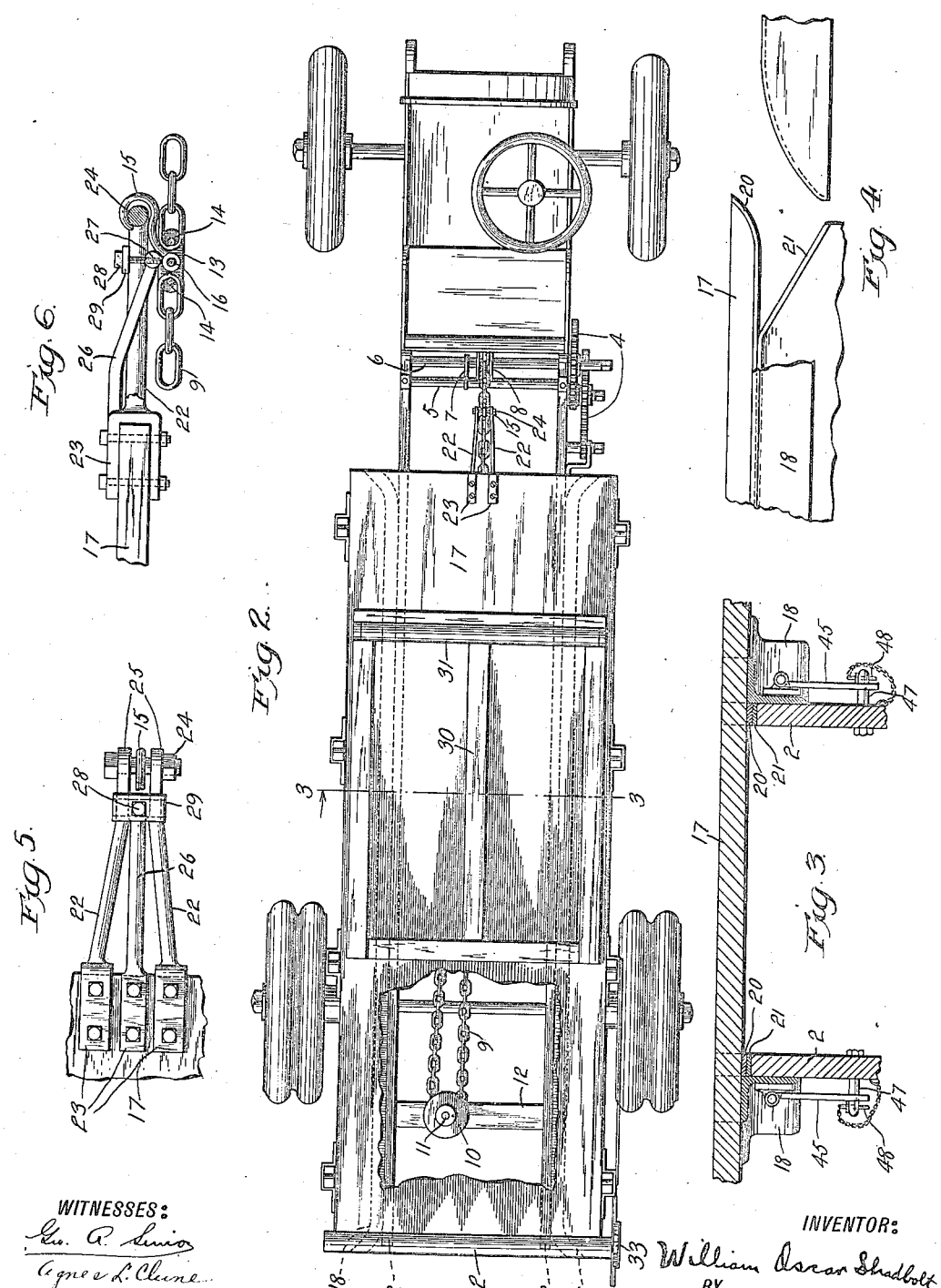

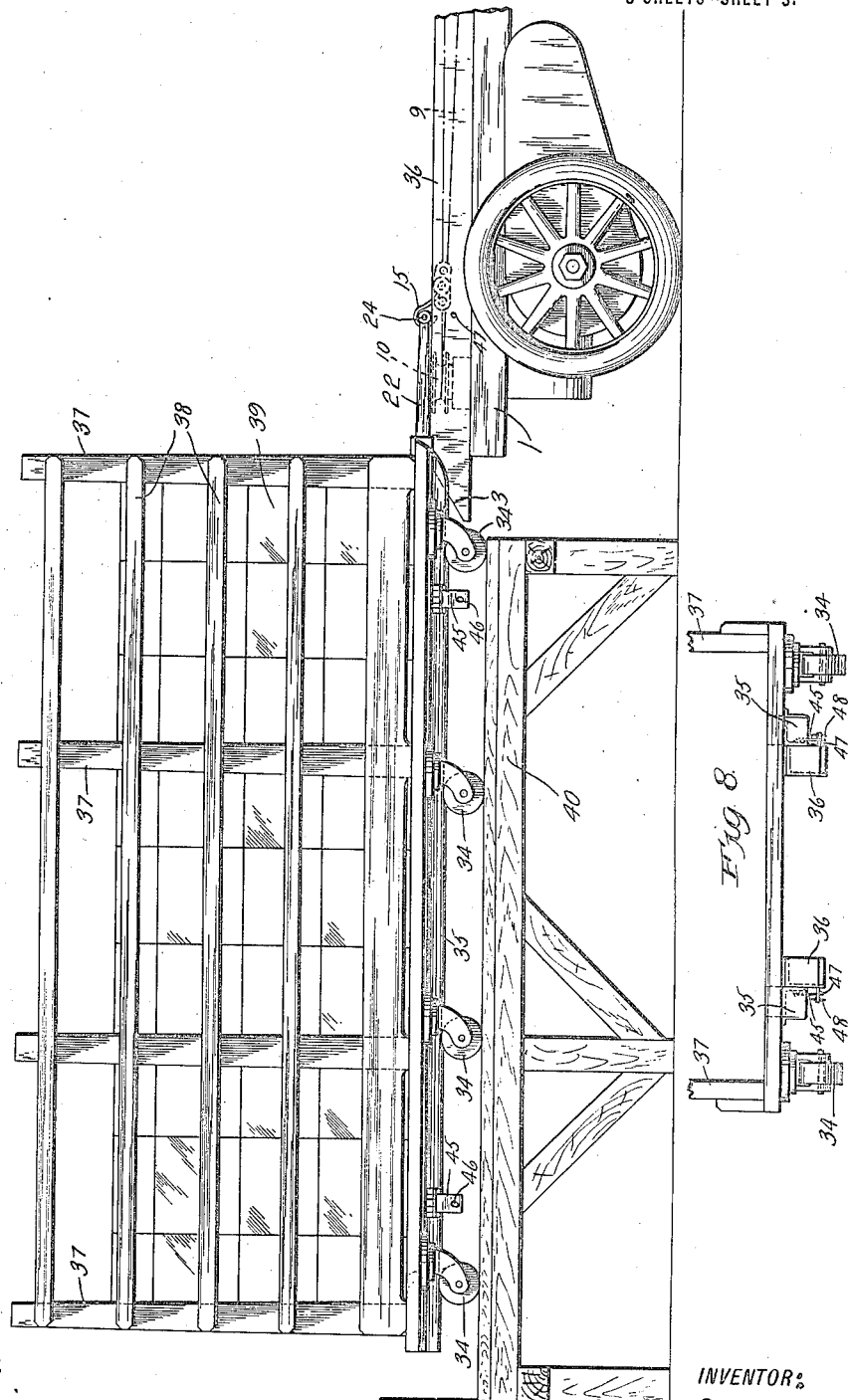

WILLIAM OSCAR SHADBOLT, OF NEW YORK, N. Y.

TRUCK.

1,167,724.　　　Specification of Letters Patent.　　Patented Jan. 11, 1916.

Application filed October 4, 1913.　Serial No. 793,405.

*To all whom it may concern:*

Be it known that I, WILLIAM OSCAR SHADBOLT, a citizen of the United States, and a resident of the city and State of New York, have invented certain new and useful Improvements in Trucks, of which the following is a specification.

This invention relates to motor trucks in which the chassis and the load carrying body or platform are separable, whereby the chassis may be in continuous use, one of such bodies being loaded off the chassis while another containing the load is being transported thereon.

The object of the invention is to provide a motor truck of this character in which the load carrying body may be easily shifted onto or off the chassis and in which such body will have a solid support on said chassis and a rolling support off said chassis.

In the accompanying drawings, Figure 1 is a side elevation of an automobile truck and removable platform, constructed according to my invention; Fig. 2 is a plan view of the same; Fig. 3 is a partial section on the line 3—3 of Fig. 2; Fig. 4 is a fragmentary side elevation of the end of the truck and platform, showing also a portion of a yard wagon adapted to receive said platform; Fig. 5 is a fragmentary view of the gripping device hereinafter described; Fig. 6 is a fragmentary side elevation of the same, provided with a chain; Fig. 7 is a side elevation of the said removable platform of the truck, showing the same upon a stationary loading platform, a portion of the main body of the truck being also shown; Fig. 8 is a fragmentary end elevation of the said rolling platform.

In carrying my invention into effect in the embodiment thereof which I have selected for illustration and description, I provide an automobile truck of any suitable construction having a chassis 1, and I secure to the same, by bolting or in any suitable manner, side rails 2, the same being slanted or sloped off at their rear ends forming lifting cams 3 to better adapt same to receive the sliding rolling platform hereafter described. At the forward end of the truck is provided a windlass, whereby power may be transmitted to the rolling platform hereafter described, the said windlass consisting of pinions and gears 4, mounted in suitable bearings secured to said members 2. The axles of said gears and pinions, designated as 5 and 6, are braced in any suitable manner, the device therefor shown in the drawings consisting of a tie member 7. The axle 6 of the last gear in the train has a pulley 8 fast thereon, said pulley being preferably notched for engagement with a chain 9, said chain 9 passing over and around the pulley 8 and around a sheave 10 pivotally mounted at 11 on a cross beam 12, said cross beam serving also as a brace for the body of the truck 1. The pinions and gears 4 are provided with suitable squared shanks for the application of the crank as commonly used on this style of windlass. The chain 9 is continuous, and one of the links thereof comprises two side plates 13 and cross-connecting pins 14, and to this link is pivotally secured a hook 15, mounted in a central stud 16.

As already stated, I provide in connection with the main portion of the truck, a removable sliding rolling platform. This platform comprises a floor section 17, provided with longitudinal rail pieces 18, as shown more particularly in Fig. 3 of the drawings, said side rail pieces 18 forming side rails which fit and slide against the side rails 2 of the chassis and form a close and steadying connection between said platform and the chassis. These rail members 18 are shown as being of the standard type of structural steel, but this construction is not essential, and the rail members can be made of wood or any other suitable material. The rails are shown as being curved or flared out at their ends, the purpose of such flares being to guide or automatically aline the rolling platform with the truck when the platform is to be rolled or mounted upon said truck. The floor 17 of the rolling platform is preferably mounted at the bottom edge of the ends, and can be reinforced by strips 20 screwed thereto for coöperation with metal strips 21, secured to the top of the members 2 of the chassis of the truck. This rounding at the end of the platform, coöperating with the tapered portions 3 of the longitudinal members 2, compensates for any difference in the levels of the body and the truck, when it is desired to place the platform upon the truck.

Any suitable means may be employed for detachably connecting the traveling platform with the endless chain. In the form shown, the platform is provided with a grappling device adapted to engage with the hook 15 on the endless chain 9. This device can be made in many forms, but in the form illustrated in the drawings it comprises side arms 22 having U-shaped bearing ends, the same engaging the floor 17, top and bottom, and having bolts through said bearing pieces 23 and the bottom 17 of the body. A bolt 24 passes through holes in enlarged portions 25 of the side pieces 22, and the hook 15 on the endless chain 9 engages with said bolt 24, whereupon, by the turning of the windlass, the body will be drawn either off or on, as the case may be, according to the direction of rotation of the windlass. To prevent deflection up or down of the chain 9, which might perhaps cause the chain to jump the sheave 10, I provide a T-shaped arm 26, (see Fig. 5) secured to the body 17, between the side pieces 22, the outer end 27 extending down beneath and between said side pieces 22, and being rigidly held by a cap-screw 28, passing through a plate 29, and threaded into said T-piece near the outer end 27.

In the case of a lumber truck, the platform can be provided with the usual form of crib 30, (see Fig. 1) having a loose roller 31 at one end, and a roller 32 capable of manual rotation by a ratchet and pawl operated lever 33, the load in this case being sustained by the rollers 31 and 32, and capable of ready removal from the body by the release of the pawl on said ratchet and the rotation of the roller 32.

In the embodiment shown in Figs. 7 and 8 the traveling platform is provided with steadying side rails 35 which engage or straddle side rails 36 of the chassis, corresponding to the side rails 2 and 18 of the other figures. The platform in this embodiment has slide contacts with the side rails 36 of the chassis, which constitute the load supporting surface thereof. The traveling platform in these figures is also provided with roller contacts 34 adapted to support the platform when off the chassis. The bearing plane of the slide contacts is above the bearing plane of the roller contacts and the lifting cams 3 are of a depth corresponding to the distance between said planes. In this Fig. 7 the platform is shown as having uprights 37 and rails 38, and loaded with boxes 39. The truck in this figure is shown as backed up to a stationary loading platform 40, and the hook 15 on the endless chain 9 is in engagement with the stud or bolt 24, the platform being in position to be drawn on to the truck.

When the platform is drawn completely on the truck, it is held in such position by hinge-plates 45, having holes 46 therein coöperating with studs 47 on the truck, said hinge-plates being capable of swinging up and down, and when the body is in position on the truck, said hinge plates thereupon being swung down, the studs 47 passing through the holes 46 in said hinge-plates, said hinge-plates being held from swinging out of coöperative position by pins 48 being placed in position in holes 46 in said studs 47.

The advantages of my invention will be evident to persons skilled in the art to which the invention relates. Owing to the high cost of automobile trucks, it is necessary that they be kept in active use in the transportation of goods for as large a proportion of each day as possible, since the time occupied in loading and unloading while the truck stands idle, is wasted so far, as the earning capacity of the truck is concerned. By using a truck constructed according to my invention, and providing a plurality of removable platforms to be used in connection therewith, it is possible to keep the truck in active use to the maximum extent. The platform can be loaded at leisure while the truck is away, and upon the return of the truck the empty platform thereon may be removed and a loaded one placed on instead, and the truck immediately sent out on another delivery trip. Where goods are loaded from various parts of a yard, a so-called yard-wagon of any suitable construction may be employed and the platform carried thereon from place to place in the yard, or if the loading is done from a stationary elevated loading platform as shown in Fig. 7 of the accompanying drawings, the movable platform may be rolled to and from the truck when it is backed up to said stationary platform.

Another advantage of my invention is that it permits the use of various kinds of carrying bodies, that is to say, movable platforms, upon the same chassis.

Having thus described my invention, what I claim as new and desire to secure by Letters Patent is as follows:

1. A motor truck comprising a chassis, a traveling platform movable onto and off said chassis, slide contacts between said elements, rollers on said platform forming roller contacts therefor in a plane below the plane of said slide contacts, said slide contacts coming into sliding engagement in the onward and offward movements of the platform and affording a steadying bearing therefor during the travel of the chassis, said roller contacts supporting said platform when off the chassis and acting in conjunction with said slide contacts to support said platform during its onward and offward movements, and inclines between said planes adapted to guide said platform from one plane to the other in the onward and offward movements thereof.

2. A motor truck comprising a chassis, a traveling platform movable onto and off said chassis, slide contacts between said elements, rollers on said platform forming roller contacts therefor in a plane below the plane of said slide contacts, said slide contacts coming into sliding engagement in the onward and offward movements of the platform and affording a steadying bearing therefor during the travel of the chassis, said roller contacts supporting said platform when off the chassis and acting in conjunction with said slide contacts to support said platform during its onward and offward movements, inclines between said planes adapted to guide said platform from one plane to the other in the onward and offward movements thereof, and lateral guides for said platform.

3. A motor truck comprising a chassis having parallel load supporting rails, a traveling platform movable onto and off said chassis, slide contacts between said elements, downward flanges disposed on said platform and adapted for lateral engagement with said rails, rollers on said platform forming roller contacts therefor on a plane below said slide contacts, inclines between said planes adapted to guide said platform from one plane to the other in the onward and offward movements thereof, and lateral guides for said platform.

In witness whereof I have hereunto signed my name this 2d day of October, 1913, in the presence of two subscribing witnesses.

WILLIAM OSCAR SHADBOLT.

Witnesses:
 EDMOND CONGAR BROWN,
 ANNA F. DUFFY.